(12) United States Patent
Zink et al.

(10) Patent No.: US 10,207,325 B2
(45) Date of Patent: Feb. 19, 2019

(54) ADDITIVE MANUFACTURE FROM MACHINED SURFACE

(71) Applicant: Delavan Inc., Des Moines, IA (US)

(72) Inventors: Gregory Zink, Des Moines, IA (US); Spencer Pack, Urbandale, IA (US); Matt Donovan, Ankeny, IA (US)

(73) Assignee: Delavan Inc., Des Moines, IA (US)

( * ) Notice: Subject to any disclaimer, the term of this patent is extended or adjusted under 35 U.S.C. 154(b) by 400 days.

(21) Appl. No.: 14/305,522

(22) Filed: Jun. 16, 2014

(65) Prior Publication Data
US 2015/0360287 A1    Dec. 17, 2015

(51) Int. Cl.
| | | |
|---|---|---|
| *B22F 3/105* | (2006.01) | |
| *B22F 3/24* | (2006.01) | |
| *B22F 7/08* | (2006.01) | |
| *F23R 3/28* | (2006.01) | |
| *F23D 11/38* | (2006.01) | |
| *B33Y 10/00* | (2015.01) | |
| *B33Y 30/00* | (2015.01) | |

(52) U.S. Cl.
CPC .............. *B22F 3/1055* (2013.01); *B22F 3/24* (2013.01); *B22F 7/08* (2013.01); *F23D 11/38* (2013.01); *F23R 3/28* (2013.01); *B22F 2003/1058* (2013.01); *B22F 2003/247* (2013.01); *B33Y 10/00* (2014.12); *B33Y 30/00* (2014.12); *F23D 2213/00* (2013.01); *F23R 2900/00018* (2013.01); *Y02P 10/295* (2015.11)

(58) Field of Classification Search
CPC .............................. B33Y 10/00; B22F 3/1055

USPC .......................................................... 419/28
See application file for complete search history.

(56) References Cited

U.S. PATENT DOCUMENTS

2013/0298403 A1    11/2013  Thomson et al.

FOREIGN PATENT DOCUMENTS

| FR | 2962357 A1 | * | 1/2012 | ............ B22F 3/1055 |
| JP | 2005220774 A | | 8/2005 | |
| JP | 2008184977 A | | 8/2008 | |

OTHER PUBLICATIONS

European Patent Office, The extended European search report, dated Nov. 5, 2015, 6 pages.
Andrzej Miszczak et al., "Surface Topography Analysis of Precision Assemblies of Fuel Injector Nozzles," Journal of Kones Internal Combustion Engines, vol. 21, No. 4, Jan. 1, 2014, pp. 353-360.
Communication Pursuant to Article 94(3) EPC for EP Application No. 15171584.4, dated Dec. 14, 2017, 11 Pages.

* cited by examiner

*Primary Examiner* — Weiping Zhu
(74) *Attorney, Agent, or Firm* — Kinney & Lange, P.A.

(57) ABSTRACT

A method of additive manufacturing includes building a component having a top surface, attaching the component to a powder bed fusion plate that receives the component, filling the powder bed fusion chamber so the powder is flush with the top surface of the component, and adding a first layer of powdered metal level with the top surface of the component. The method of additive manufacturing also includes fusing the first layer of powdered metal to the top surface of the component to create a fusion joint, and building up an additively manufactured body from the top surface of the component in subsequent layers.

6 Claims, 6 Drawing Sheets

ADDITIVE MANUFACTURE FROM MACHINED SURFACE

BACKGROUND

The present invention relates generally to additive manufacturing and, more particularly, to additive manufacturing using powder bed fusion.

Additive manufacturing technology can be used for building component designs that were not previously possible using conventional machining methods, such as complex fuel passages and heat shields. In addition to the ability to build components having complex geometry, additive manufacturing can also eliminate weak junctures, such as seams and braze or weld joints. Typical additive manufacturing methods, such as powder bed fusion, produce completed parts with extremely rough surface finishes. A rough surface finish can be detrimental to the function of some components, such as atomizer fuel circuit exit passages, which require very smooth surfaces to control flow number and atomizer spray uniformity.

Current methods of resolving surface finish issues include machining accessible additively manufactured passages to control surface finish, which is very time consuming and limited by the small portion of the fuel passage which is externally accessible. Another method of resolving surface finish is to braze or weld machined parts, which is costly and difficult to execute due to space requirements of some components, such as atomizer tips. Other methods that improve the surface finish of internal passages are problematic because it is difficult to control which areas are smoothed and which are not.

SUMMARY

A method of additive manufacturing includes building a component having a top surface, attaching the component to a powder bed fusion plate that receives the component, filling the powder bed fusion chamber so the powder is flush with the top surface of the component, and adding a first layer of powdered metal level with the top surface of the component. The method of additive manufacturing also includes fusing the first layer of powdered metal to the top surface of the component to create a fusion joint, and building up an additively manufactured body from the top surface of the component in subsequent layers.

An additive manufacturing system includes a component having a top surface, a powder bed plate for receiving the component, and a first layer of powdered metal level with the top surface of the component attached to the powder bed fusion plate. An additive manufacturing system also includes an additively manufactured body built up from the top surface of the component, and a fusion joint formed between the component and the additively manufactured body.

DETAILED DESCRIPTION

Figure 1:
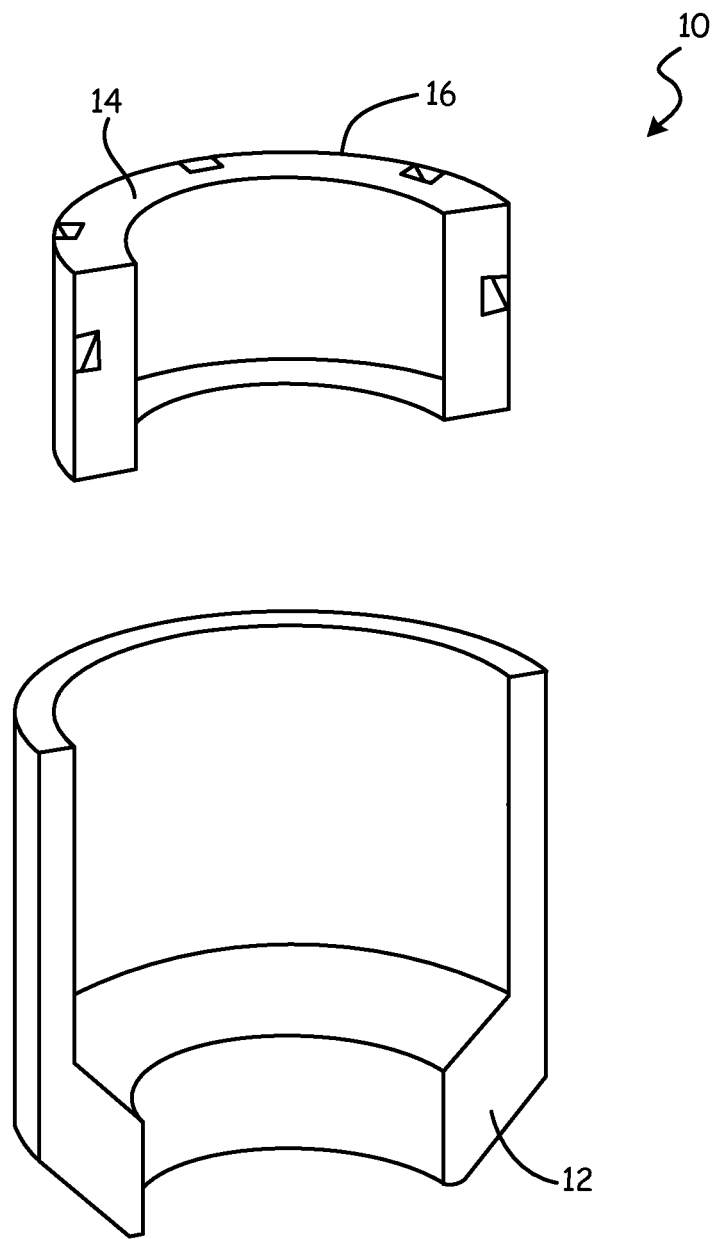
FIG. 1 is an exploded cross section view of a portion of a fuel nozzle tip.

FIG. 1 is an exploded cross section view of a portion of a fuel nozzle tip 10, which includes nozzle cone 12 and prefilmer 14. In some embodiments, nozzle tip 10 can be formed by any conventional mechanical machining method. In other embodiments, nozzle tip 10 can be formed by non-conventional machining methods, including electrochemical and abrasive flow machining. In other embodiments, nozzle tip 10 may be formed by other methods, including casting or forging. Nozzle tip 10 can be any component that could take advantage of the benefits of additive manufacturing, such as having a threaded fitting for attachment to an injector. Nozzle cone 12 and prefilmer 14 can be machined and attached together using brazing, shrink-fitting, or other attachment means. Nozzle tip 10 also includes top surface 16, which can be machined to form an essentially flat surface for growing an additively manufactured body (not shown in FIG. 1). Nozzle tip 10 can be made to have complex exit geometry to take advantage of downstream additive manufacturing benefits, such as building intricate fuel passages. The non-additively manufactured component is often manufactured from stainless steels or nickel based alloys. Stainless steels can include but are not limited to stainless steel 347, stainless steel 316, and stainless steel 410. Nickel based alloys can include but are not limited to Inconel 625, Inconel 718, and Hast-X.

Figure 2:
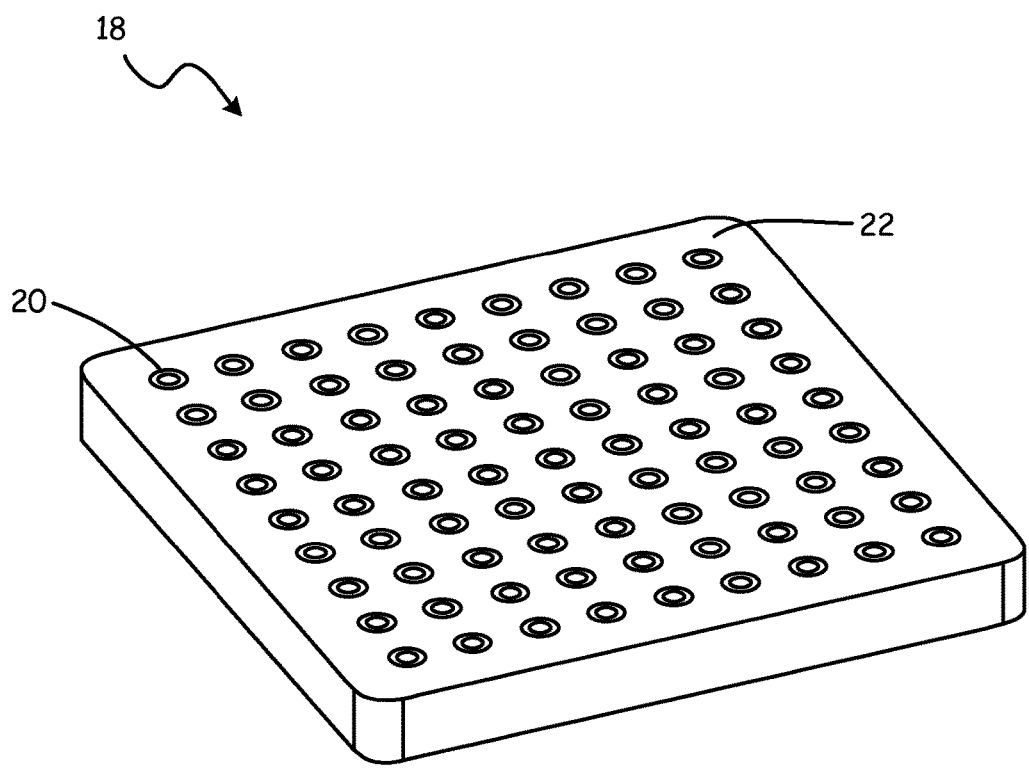
FIG. 2 is a perspective view of a powder bed fusion plate.

FIG. 2 is a perspective view of a powder bed fusion plate 18, which can include one or more nests 20 for receiving components, such as nozzles 10 or threaded fittings (not shown in FIG. 2), and surface 22. Surface 22 can be machined as desired, depending on the geometry of the machined component to be attached to powder bed fusion plate 18. In some embodiments, surface 22 of powder bed fusion plate 18 can have nests 20 for securing components in powder bed fusion plate 18. In other embodiments, surface 22 of powder bed fusion plate 18 can be smooth, and components can be secured to surface 22 by any appropriate attachment means, including low-temperature soldering; tack welding or ball tack welding; slight press fit, or interference fit, with the fixture plate; or a plate with a locking fixture built in. Alternatively, components can be positioned on the powder bed fusion plate and not fixtured. In other embodiments, nozzle tip 10 can be inserted into nest 20 where the geometry of nest 20 and nozzle tip 10 secure nozzle tip 10 to powder bed fusion plate 18.

Figure 3:
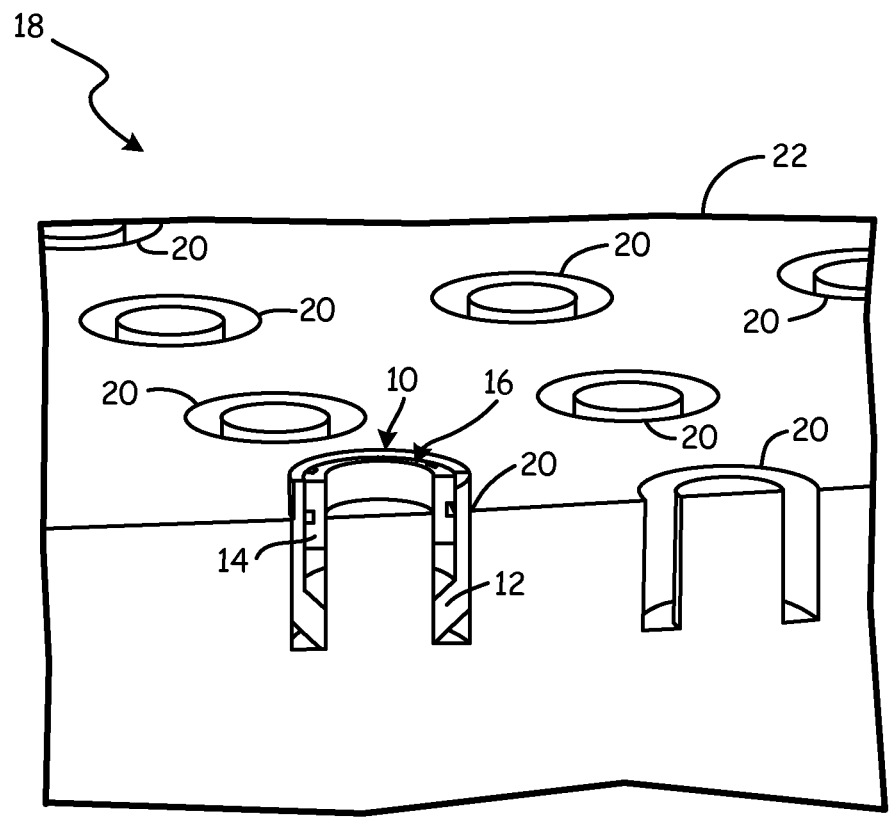
FIG. 3 is a cross section view of a machined nozzle tip attached to a powder bed fusion plate.
Figure 4:
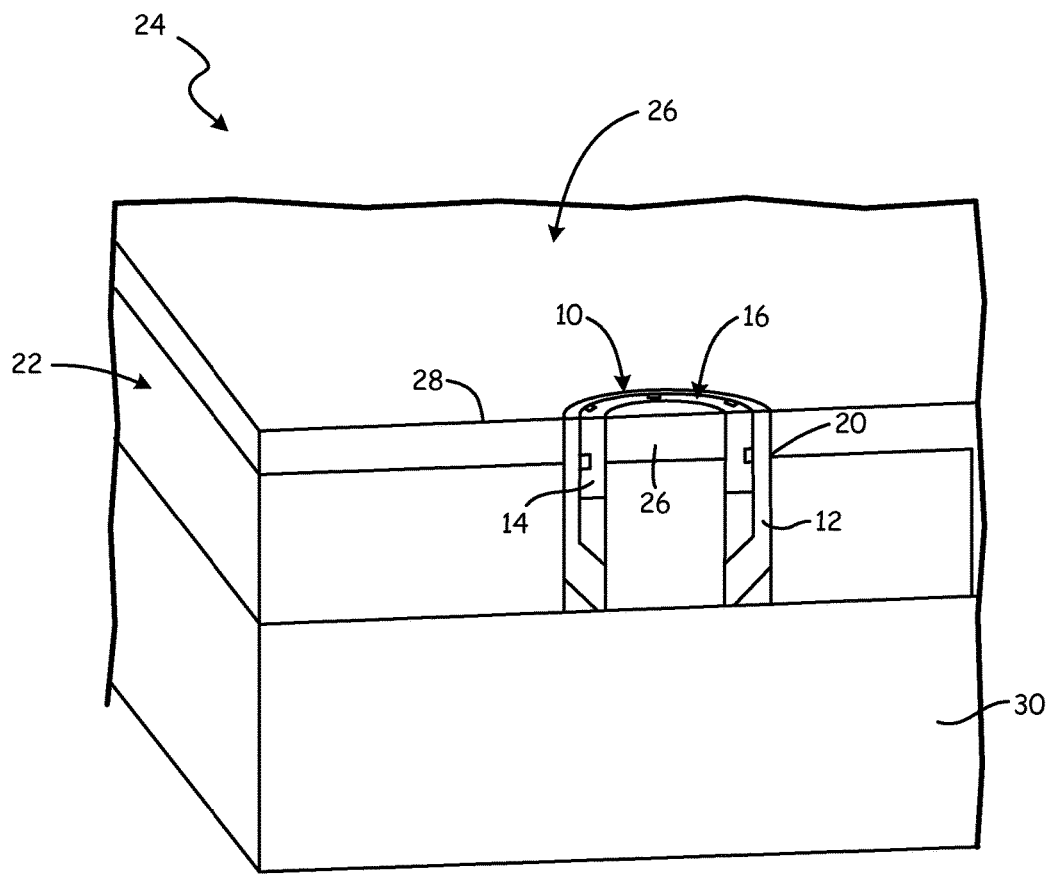
FIG. 4 is a cross section view of a leveled powder bed with a machined nozzle tip.

FIG. 3 is a cross section view of nozzle tip 10. Nozzle tip 10 is attached to powder bed fusion plate 18 within one of nests 20. As shown in FIG. 3, nests 20 are shaped to receive nozzle tip 10. In some embodiments, nests 20 can have different geometries to secure components having geometries different from nozzle tip 10 in place within powder bed fusion plate 18. Nozzle tip 10 can extend out from nest 20, such that top surface 16 is not level with surface 22. In the embodiment shown in FIG. 3, top surface 16 extends past (above) surface 22. FIG. 4 is a cross section view of leveled powder bed 24 resting on base 30 of a powder bed fusion machine chamber (not shown). In some embodiments, nozzle tip 10 can be attached to powder bed fusion plate 18 within nest 20 such that nozzle tip 10 extends out from nest 20. Nozzle tip 10 includes top surface 16, which can have an essentially flat surface for building up an additively manufactured body (not shown in FIG. 4). The top surface 16 can be machined to be flat either during the manufacture of nozzle tip 10, or after being added to the nests 20 in the powder bed fusion plate 18. Powdered metal 26 can be filled to level 28, which in the embodiment shown in FIG. 4 is generally even and level with top surface 16. Powdered metal 26 can be any metal typically used in powder bed additive manufacturing that can fuse with the machined component or components, including but not limited to stainless steel, cobalt chrome, Inconel 625, and Hast-X. Level 28 is set by the powder bed fusion machine and, in some embodiments, can be set at zero level with top surface 16. In other embodiments, level 28 can be set as a functional gradient that is not level with top surface 16. Once the zero level is set, another layer of powdered metal 26 (not shown in FIG. 4) can be added to cover top surface 16. An energy beam such as an electron beam or laser (not shown) can be run across top surface 16 to fuse powdered metal 26 to top surface 16 to form a first layer. The first layer of powdered metal may be fused, either partially or completely top surface 16 to create a fusion joint with a desired contour. The additively manufactured body can then be built up by adding subsequent layers of powdered metal 26 and fusing powdered metal 26 to the preceding layer.

Figure 5:
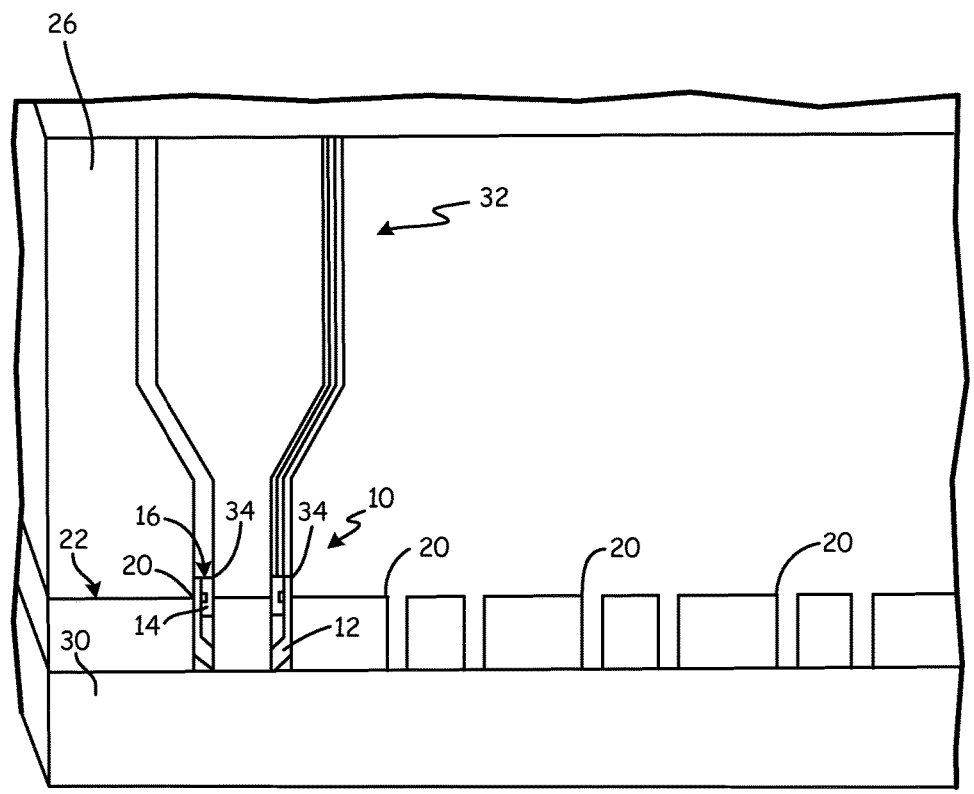
FIG. 5 is a cross section view of a nozzle body grown from a machined nozzle tip.

FIG. 5 is a cross section view of nozzle body 32 grown from machined nozzle tip 10. Machined nozzle tip 10 is attached to powder bed fusion plate 18 within nest 20. Powdered metal 26 is added to a zero level set by a powder bed fusion machine (not shown). An energy beam such as an electron beam or laser (not shown) can be run across top surface 16 to form fusion joint 34. Fusion joint 34 is the location where nozzle tip 10 and nozzle body 32 are joined. Nozzle body 32 can then be grown by adding subsequent layers of powdered metal 26 and fusing each layer of powdered metal 26 to the preceding layer. Base 30 is lowered within the powder bed fusion machine chamber (not shown) to allow for additional layers of powdered metal 26 to be added. By fusing subsequent layers of powdered metal 26 to top surface 16 of nozzle tip 10, additive manufacturing can produce components having a variety of geometries. In some embodiments, nozzle body 32 can have complex geometry with convoluted fuel channels and/or integral heat shielding, while nozzle cone 12 and prefilmer 14 of nozzle tip 10 can have a smooth surface finish, ideally less than 16 microinches, for controlling flow number and atomizer spray uniformity.

Figure 6:
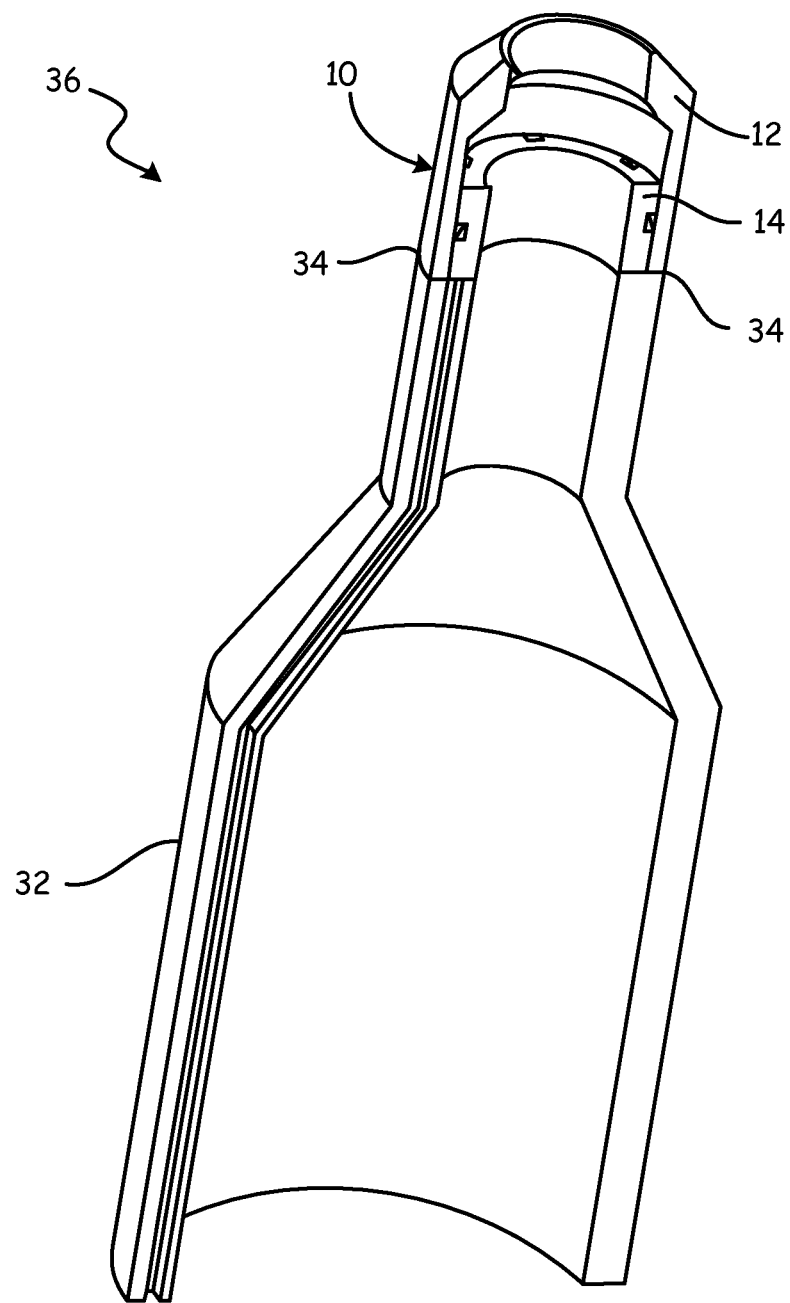
FIG. 6 is a cross section view of a nozzle body with a machined nozzle tip removed from a powder bed fusion plate.

FIG. 6 is a cross section view of fuel atomizer 36 having nozzle body 32 fused with nozzle tip 10. Fuel atomizer 36 can be removed from powder bed fusion plate 18 (not shown in FIG. 6) by first blowing away or sieving off loose metal powder around fuel circuit 32. The method of removing fuel atomizer 36 also includes removing nozzle tip 10 from nest 20 of powder bed fusion plate 18. The removal of nozzle tip 10 from nest 20 can vary depending on how nozzle tip 10 is attached to powder bed fusion plate 18. In some embodiments, fuel atomizer 36 can be simply pulled away from powder bed fusion plate 18 so that nozzle tip 10 is lifted out of nest 20. In other embodiments, a machining method, such as cutting or wire electric discharge machining, can be used to remove nozzle tip 10 from nest 20 of powder bed fusion plate 18. As shown in FIG. 6, fuel atomizer 36 includes nozzle tip 10, which is fused to nozzle body 32 at fusion joint 34. Fuel circuit 32 can be formed from any powdered metal typically used in powder bed additive manufacturing that can fuse with nozzle tip 10. Fuel atomizer 36 possesses both the smooth surface finish of non-additively manufactured nozzle tip 10 in addition to the additively manufactured fuel circuit 32 that contains intricate fuel passages.

Discussion of Possible Embodiments

The following are non-exclusive descriptions of possible embodiments of the present invention.

A method of additive manufacturing can include building a component having a top surface; attaching the component to a powder bed fusion plate configured to receive the component; filling the powder bed fusion chamber so the powder is flush with the top surface of the component; adding a first layer of powdered metal level with the top surface of the component; fusing the first layer of powdered metal to the top surface of the component to create a fusion joint; and building up an additively manufactured body from the top surface of the component in subsequent layers.

The method of additive manufacturing of the preceding paragraph can optionally include, additionally and/or alternatively, any one or more of the following features, configurations and/or additional components:

A further embodiment of the foregoing method of additive manufacturing can include machining the component such that some or all of the features of the machined component have a surface finish less than 16 microinches.

A further embodiment of any of the foregoing methods of additive manufacturing can include machining a plurality of nests in the powder bed fusion plate in which a plurality of components are attached.

A further embodiment of any of the foregoing methods of additive manufacturing can include setting a zero coordinate level with the top surface of the component.

A further embodiment of any of the foregoing methods of additive manufacturing can include adding the first layer of powdered metal up to the zero coordinate level.

A further embodiment of any of the foregoing methods of additive manufacturing can include fusing the additively manufactured body to the top surface of the component at the fusion joint by a directed energy beam selected from the group consisting of electron beams and lasers.

A further embodiment of any of the foregoing methods of additive manufacturing can include building up the additively manufactured body comprises fusing additional layers of powdered metal to the first layer of powdered metal.

A further embodiment of any of the foregoing methods of additive manufacturing can include removing the additively manufactured body and the component from the powder bed fusion plate.

An additive manufacturing system can include a component having a top surface; a powder bed fusion plate configured to receive the component; a first layer of powdered metal level with the top surface of the component attached to the powder bed fusion plate; an additively manufactured body built up from the top surface of the component; and a fusion joint formed between the component and the additively manufactured body.

The additive manufacturing system of the preceding paragraph can optionally include, additionally and/or alternatively, any one or more of the following features, configurations and/or additional components:

A further embodiment of the foregoing additive manufacturing system can include that the component comprises an atomizer component.

A further embodiment of any of the foregoing additive manufacturing systems can include that the atomizer component comprises a fuel circuit nozzle.

A further embodiment of any of the foregoing additive manufacturing systems can include that some or all of the features of the machined component have a surface finish less than 16 microinches.

A further embodiment of any of the foregoing additive manufacturing systems can include that the powder bed fusion plate comprises a plurality of nests configured to hold a plurality of components.

A further embodiment of any of the foregoing additive manufacturing systems can include that the additively manufactured body is fused to the top surface of the component at the fusion joint by a directed energy beam selected from the group consisting of electron beams and lasers.

A further embodiment of any of the foregoing additive manufacturing systems can include that the additively manufactured body is built up by fusing additional layers of powdered metal to the first layer of powdered metal.

Although the present invention has been described with reference to preferred embodiments, workers skilled in the art will recognize that changes may be made in form and detail without departing from the spirit and scope of the invention.

The invention claimed is:

1. A method of manufacturing an atomizer fuel circuit nozzle, the method comprising:
   building a nozzle tip comprising:
      a nozzle cone having an outer diameter;
      a prefilmer sized to nest within the nozzle cone, wherein the prefilmer has a top surface; and
      one or more fuel circuit exit passages;
   attaching the nozzle tip to a powder bed fusion plate within a powder bed fusion chamber configured to receive the nozzle tip so that the top surface of the nozzle tip is located above a top surface of the powder bed fusion plate;
   filling the powder bed fusion chamber so that powdered metal surrounds and is flush with the top surface of the nozzle tip;
   adding a first layer of powdered metal to the powder bed fusion chamber so that the powder bed fusion chamber is filled with the powdered metal over the top surface of the nozzle tip;
   fusing a portion the first layer of powdered metal to the top surface of the nozzle tip to create a fusion joint; and
   building up an additively manufactured nozzle body from the top surface of the nozzle tip in subsequent layers to create the nozzle, wherein the nozzle body comprises:
      a cylindrical first body section connected to and extending away from the nozzle tip and having a first diameter equal to the nozzle cone outer diameter;
      a conical second body section connected to and extending away from the first body section; and
      a cylindrical third body section connected to and extending away from the second body section and having a second diameter greater than the first diameter; and
   machining the nozzle tip such that the one or more fuel circuit exit passages have a surface finish of less than 16 microinches.

2. The method of additive manufacturing of claim 1, further comprising setting a zero coordinate level with the top surface of the nozzle tip.

3. The method of additive manufacturing of claim 2, further comprising adding powdered metal up to the zero coordinate level.

4. The method of additive manufacturing of claim 1, further comprising fusing the additively manufactured nozzle body to the top surface of the nozzle tip at the fusion joint by a directed energy beam selected from the group consisting of electron beams and lasers.

5. The method of additive manufacturing of claim 1, wherein building up the additively manufactured nozzle body comprises fusing selected portions of additional layers of powdered metal on a layer by layer basis.

6. The method of additive manufacturing of claim 1, further comprising removing the additively manufactured nozzle body and the nozzle tip from the powder bed fusion plate.

* * * * *